(12) United States Patent
Karlsson et al.

(10) Patent No.: US 11,668,296 B2
(45) Date of Patent: Jun. 6, 2023

(54) HYDRAULIC SYSTEM AND METHOD FOR CONTROLLING THE SPEED AND PRESSURE OF A HYDRAULIC CYLINDER

(71) Applicant: JOAB FORSALJNINGS AB, Gothenburg (SE)

(72) Inventors: Rikard Karlsson, Backefors (SE); Tommy Jansson, Lidkoping (SE)

(73) Assignee: JOAB FORSALJNINGS AB, Gothenburg (SE)

( * ) Notice: Subject to any disclaimer, the term of this patent is extended or adjusted under 35 U.S.C. 154(b) by 657 days.

(21) Appl. No.: 16/519,938

(22) Filed: Jul. 23, 2019

(65) Prior Publication Data
US 2020/0025185 A1    Jan. 23, 2020

(30) Foreign Application Priority Data
Jul. 23, 2018  (SE) .................................. 1850933-1

(51) Int. Cl.
*F04B 49/22*    (2006.01)
*F15B 15/26*    (2006.01)
(Continued)

(52) U.S. Cl.
CPC .............. *F04B 49/22* (2013.01); *F04B 49/08* (2013.01); *F15B 15/26* (2013.01); *F16K 11/00* (2013.01)

(58) Field of Classification Search
CPC ........ F15B 15/26; F15B 11/08; F15B 11/003; F15B 11/02; F15B 11/04; F16K 11/00; F04B 49/22; F04B 49/08
See application file for complete search history.

(56) References Cited

U.S. PATENT DOCUMENTS

| 4,206,688 A | 6/1980 | Haak et al. |
| 4,610,193 A * | 9/1986 | Barker .................. F15B 11/003 91/420 |

(Continued)

FOREIGN PATENT DOCUMENTS

| DE | 10340506 A1 | 4/2005 |
| DE | 102008064138 A1 | 7/2010 |

(Continued)

OTHER PUBLICATIONS

Swedish Search Report for Application No. 1850933-1; Search Report Completed: Feb. 18, 2019; 3 Pages.

(Continued)

*Primary Examiner* — Bryan M Lettman
(74) *Attorney, Agent, or Firm* — Cantor Colburn LLP (57) ABSTRACT

A hydraulic system includes a hydraulic valve, a load-holding valve arrangement, a flow-control valve arrangement, a working pressure sensor, a differential pressure sensor, and a speed sensor. The load-holding valve arrangement includes first and second load-holding valves connected to opposite ends of the hydraulic cylinder. The flow-control valve arrangement includes a directional flow-control valve and a hydraulic pump. The differential pressure sensor measures pressure over the load-holding valve arrangement. A desired extension or retraction speed of the hydraulic cylinder is controlled by adjusting the position of the directional flow-control valve, the first load-holding valve and the second load-holding valve based on a measured working pressure in the hydraulic system and a measured speed of the hydraulic cylinder or a differential pressure over the load-holding valve arrangement.

8 Claims, 10 Drawing Sheets

(51) Int. Cl.
   *F16K 11/00* (2006.01)
   *F04B 49/08* (2006.01)

(56) References Cited

U.S. PATENT DOCUMENTS

| | | |
|---|---|---|
| 6,161,467 A | 12/2000 | A'Hearn et al. |
| 6,220,027 B1 | 4/2001 | Heusser |
| 2005/0015102 A1 | 3/2005 | Nielsen et al. |
| 2005/0051026 A1* | 3/2005 | Nielsen ................. F15B 11/044 |
| | | 91/462 |
| 2006/0162544 A1 | 7/2006 | Loedige et al. |
| 2006/0201321 A1 | 9/2006 | Loedige et al. |
| 2007/0277519 A1* | 12/2007 | Jessen .................... F15B 11/05 |
| | | 60/462 |
| 2016/0084271 A1* | 3/2016 | Gomm ................. F15B 20/008 |
| | | 60/327 |
| 2017/0184139 A1* | 6/2017 | Bhaskar ................. F15B 11/08 |
| 2018/0100525 A1* | 4/2018 | Vigholm ............... F15B 11/165 |

FOREIGN PATENT DOCUMENTS

| | | |
|---|---|---|
| EP | 2016818 A1 | 1/2009 |
| WO | 2005005842 A1 | 1/2005 |

OTHER PUBLICATIONS

European Search Report for Application No. 19185729.1 dated Dec. 13, 2019; 10 pages.

\* cited by examiner

HYDRAULIC SYSTEM AND METHOD FOR CONTROLLING THE SPEED AND PRESSURE OF A HYDRAULIC CYLINDER

CROSS-REFERENCE TO RELATED APPLICATION

This Application claims priority to Swedish Application No. 1850933-1, filed Jul. 23, 2018, which is incorporated herein by reference in its entirety.

INTRODUCTION

This disclosure relates to a hydraulic system and a method for controlling a speed and pressure of a hydraulic cylinder in a hydraulic system. The system includes a hydraulic cylinder fluidly connected to a load-holding valve arrangement including a first load-holding proportional valve connected to a first end of the hydraulic cylinder and a second load-holding proportional valve connected to a second end of the hydraulic cylinder. The system further includes a flow-control valve arrangement including a directional proportional flow-control valve and at least one hydraulic pump.

BACKGROUND

Hydraulic movement may be achieved by using a combustion engine or an electric motor as a source for providing hydraulic power to a system. Often a cylinder is required to move over center using over-center valves. Current solutions may cause energy to be spent even when a cylinder is moving without any external loads.

When using a vehicle such as a forklift, a method known as gravity-lowering or gravity-assist is used to facilitate downward movement of the forks. This method uses gravity acting on the load to move the load held by the forklift.

However, when moving a load that changes from pushing a load to pulling a load due to construction geometry, most known systems are designed with an over-center valve. These valves control the load by holding a constant differential pressure over first and second ends of the cylinders. This differential pressure will be the lost energy when moving cylinders without any load.

In short, there is thus a general need for improvements in the field of hydraulic systems and methods for controlling the movement of a hydraulic cylinder.

SUMMARY

This disclosure relates to a method for controlling a speed of a hydraulic cylinder in a hydraulic system. The system includes a hydraulic cylinder fluidly connected to a load-holding valve arrangement including a first load-holding valve connected to a first end of the hydraulic cylinder and a second load-holding valve connected to a second end of the hydraulic cylinder. The system further includes a flow-control valve arrangement including a directional flow-control valve and at least one hydraulic pump. The method includes inputting a desired extension or retraction speed for the hydraulic cylinder by means of an operator controller, measuring a working pressure within the hydraulic system, and measuring a speed of the hydraulic cylinder or a differential pressure over the load-holding valve arrangement. Depending on the measured working pressure and one of the speed of the hydraulic cylinder or the differential pressure over the load-holding valve arrangement, the system activates a first mode, a second mode, or a third mode. An extension speed or a retraction speed of the hydraulic cylinder in each mode is controlled by adjusting a position of the flow-control valve, the first load-holding valve and the second load-holding valve. The first mode is a pushing/pulling mode, the second mode is a neutral movement mode, and the third mode is a gravity-assisted movement mode.

Adjusting the position of the flow control valve, the first load-holding valve, and the second load-holding valve may include additional steps. For example, if the measured working pressure within the hydraulic system is lower than a first pressure needed to move the hydraulic cylinder at the desired extension or retraction speed, the system may activate the first mode in which a load from the cylinder is identified to determine the first pressure, the position of the flow-control valve is adjusted to control the speed of the hydraulic cylinder, the position of the first load-holding valve is set to a closed position and the position of the second load-holding valve is set to a fully open position. In the first mode, the directional flow-control valve may be used for speed control and the second load-holding valve may be opened to a fully open positon for minimal energy loss throughout the system. This corresponds to a mode in which additional pressure is required to move the cylinder at the desired speed, either for pushing or for pulling a load. This includes vertical and/or horizontal movement of the load being pushed or pulled.

The method of adjusting the position of the flow control valve, the first load-holding valve and the second load-holding valve may further include additional steps. As another example, if the measured working pressure decreases, and if the speed of the hydraulic cylinder is constant or increasing relative the desired extension or retraction speed, the system may operate to activate a second mode in which the position of the flow-control valve and the first load-holding valve is adjusted to control the speed of the hydraulic cylinder and the position of the second load-holding valve is set to a closed position. In the second mode, which may be set when less pressure is needed as the cylinder works in light conditions, i.e. when a load attached to the hydraulic cylinder has passed center but is still close to center, the first load-holding valve may start to control the speed of the cylinder, together with the directional flow-control valve. The system can also be said to work in hybrid mode as both the directional flow-control valve and the first load-holding valve controls the speed of the cylinder.

The method of adjusting the position of the flow control valve, the first load-holding valve and the second load-holding valve may further include additional steps. As yet another example, if the measured working pressure and the speed of the cylinder indicates that the hydraulic system moves by its own weight, the third mode may be activated. In this example, the third mode may be a mode in which the position of the flow-control valve may be set to center and the first load-holding valve may be adjusted to control the speed of the hydraulic cylinder, and the position of the second load-holding valve may be set to a fully open position. When the directional control valve is fully open and the measured working pressure is lower than a predetermined pressure for the desired speed of the cylinder, this may indicate that the hydraulic cylinder moves by its own weight or is said to be gravity-assisted. This may set the third mode, in which the directional flow-control valve is set to center, the first load-holding valve is adjusted to control the speed of the hydraulic cylinder, and the position of the second load-holding valve is set to a fully open position.

The system may further include a proportional pressure limiter. The method may further adjust the system pressure by means of the proportional pressure limiter. In the first mode, the pressure can be adjusted to different values by using the proportional pressure limiter. Depending on a direction of the movement of the hydraulic cylinder or a position of the hydraulic cylinder, the pressure may be adjusted to maintain a constant force on the hydraulic cylinder on both inward and outward movement of the hydraulic cylinder.

The method may further transition seamlessly between the first, second, and/or third mode depending on the measured working pressure and the speed of the hydraulic cylinder or a differential pressure over the load-holding valve arrangement. The seamless transition may assist in ensuring that the appropriate mode is used at all times.

This disclosure further relates to a hydraulic system including a hydraulic cylinder fluidly connected to a load-holding valve arrangement. The hydraulic system includes a first load-holding valve connected to a first end of the hydraulic cylinder and a second load-holding valve connected to a second end of the hydraulic cylinder. The system further includes a flow-control valve arrangement including a directional flow-control valve and at least one hydraulic pump, a working pressure sensor, and a cylinder speed sensor or a differential pressure sensor arranged to measure pressure over the load-holding valve arrangement. The system is configured for activating a first mode, a second mode, and a third mode. In each mode, a desired extension or retraction speed of the hydraulic cylinder is controlled by adjusting the position of the flow-control valve, the first load-holding valve, and the second load-holding valve, depending on a measured working pressure in the system and a measured speed of the hydraulic cylinder or a differential pressure over the load-holding valve arrangement.

The hydraulic system may be configured for activating the first mode if the measured working pressure within the hydraulic system is lower than a first pressure needed to move the hydraulic cylinder at the desired extension or retraction speed. A load from the cylinder may be identified by the system to determine a first pressure needed to move the hydraulic cylinder at the desired extension or retraction speed. A position of the flow-control valve may be adjusted to control the speed of the hydraulic cylinder. A position of the first load-holding valve may be set to a closed position and the position of the second load-holding valve may be set to a fully open position.

The hydraulic system may be further configured for activating the second mode if the measured working pressure decreases and if the speed of the hydraulic cylinder is constant or increasing relative the desired extension or retraction speed. A position of the flow-control valve and the first load-holding valve may be adjusted to control the speed of the hydraulic cylinder and the position of the second load-holding valve may be set to a closed position.

The hydraulic system may be further configured for activating the third mode if the measurement of the hydraulic cylinder indicates that the hydraulic cylinder moves by its own weight. A position of the flow-control valve may be set to center and the first load-holding valve may be adjusted to control the speed of the hydraulic cylinder and the position of the second load-holding valve may be set to a fully open position.

The system may further include a proportional pressure-limiting valve. The proportional pressure-limiting valve nay be used in the first mode.

The first load-holding valve, the second load-holding valve and the flow-control valve may be proportional valves.

The load-holding valve arrangement may be separate from or integrated with the flow-control valve arrangement into a combined load-holding valve and flow-control arrangement. Depending on the application, the load-holding valve arrangement and the flow-control valve arrangement may be positioned on different locations on the vehicle on which it is installed, either separate from each other or as an integrated unit. This allows for a flexible hydraulic system.

The system further may further include a proportional pressure limiter arranged to adjust the system pressure.

BRIEF DESCRIPTION OF THE DRAWINGS

Other features, advantages, and details appear, by way of example only, in the following detailed description, the detailed description referring to the drawings in which.

DETAILED DESCRIPTION

The hydraulic system and method described herein are suitable for use with hydraulically operated equipment and/or vehicles. Non-limiting examples of the hydraulically operated equipment and/or vehicles include hook lifts, dumpers, stationary cranes, crane vehicles, forklifts, bucket loaders, front loaders, front-end loaders, payloaders, scoops, shovels, skip loaders, wheel loaders or skid loaders.

Figure 1:
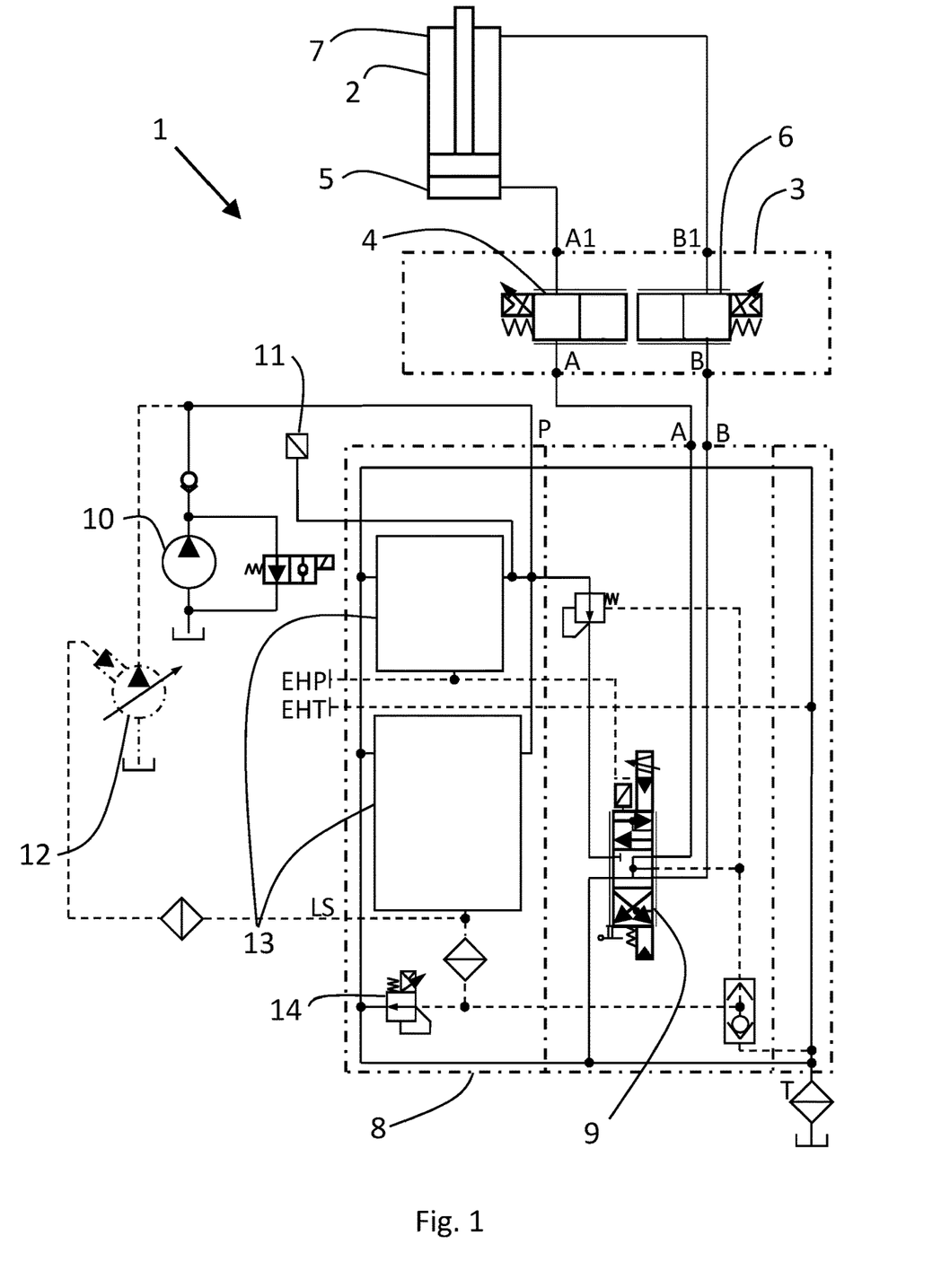
FIG. 1 is a schematic diagram showing an example of a hydraulic system in an inactive state.

FIG. 1 schematically shows a hydraulic system 1 according to a first example with the hydraulic system 1 in an inactive state. The hydraulic system 1 may include a hydraulic cylinder 2 fluidly connected to a load-holding valve arrangement 3. The load-holding valve arrangement 3 comprises a first load-holding valve 4 connected to a first end 5 of the hydraulic cylinder 2 and a second load-holding valve 6 connected to a second end 7 of the hydraulic cylinder 2. The hydraulic system 1 may further include a flow-control valve arrangement 8 fluidly connected to the load-holding valve arrangement 3. The flow-control valve arrangement 8 may include a directional flow-control valve 9. The hydraulic system 1 also may include at least one hydraulic pump 10 fluidly connected to the flow-control valve arrangement 8 that may be arranged to provide hydraulic fluid flow to the hydraulic system 1. A pressure sensor 11 may be attached to a pressure line from the at least one hydraulic pump 10 and may measure the working pressure of the hydraulic system 1. The pressure sensor 11 may for instance be a PT sensor or a PU sensor. The hydraulic system 1 may further include a hydraulic cylinder position and speed sensor (not shown) arranged to measure both position and movement speed of the hydraulic cylinder 2. The cylinder speed sensor may for instance be an angular sensor, a linear potentiometer, or a pulse encoder.

The first and second load-holding valves 4, 6 of the load-holding valve arrangement 3 may be electronically operated or proportional. Non-limiting example of the valves include a solenoid valve, a 2-way valve, a normally closed valve, a proportional valve, or a poppet-type valve. The first and second load-holding valves 4, 6 may alternatively be a direct-acting, pilot-operated, or servo-operated, normally open and spool-type valve.

The directional flow-control valve 9 of the flow-control valve arrangement 8 is for example a pilot operated 4/3 valve, normally closed, and proportionally controlled. Alternatively, the directional flow-control valve 9 may be a poppet valve or a spool valve. Another example of a directional flow-control valve 9 is described below. Maximum flow through the directional flow-control valve 9 may be designed for a specific application. The flow-control valve arrangement 8 may further include a hydraulic valve arrangement 13 arranged to protect the hydraulic system 1 and to regulate and operate pilot pressure to the directional flow-control valve 9 with a pilot supply line (EHP) and a pilot tank line (EHT).

It is contemplated that the directional flow-control valve 9 can be operated in other ways. For example, the directional flow-control valve 9 may be direct-acting, pilot-operated, or servo-operated.

As mentioned above, the hydraulic system 1 may include the at least one hydraulic pump 10. In this example, the at least one hydraulic pump 10 may be a fixed displacement and pressure-compensated hydraulic pump. The hydraulic system 1 may alternatively be a load-sensing hydraulic system with a variable-displacement hydraulic pump 12 arranged to provide additional hydraulic fluid to the system based on a load sensed. Such a system is illustrated in the figures. The variable-displacement hydraulic pump 12 is indicated in dashed line to indicate that it is optional.

The hydraulic system 1 may further include a proportional pressure limiter 14 arranged to adjust the pressure in the first mode to maintain a constant force on the hydraulic cylinder 2 on both inward and outward movement of the hydraulic cylinder 2. The proportional pressure limiter 14 may be a solenoid operated two-way pressure relief valve, normally open.

The following description illustrates examples of functions of the hydraulic system 1 during three different modes. In these examples, it is assumed that the hydraulic cylinder 2 is operating with a load attached to the hydraulic cylinder 2 and that the hydraulic cylinder 2 has a range of motion where the load moves over center.

A geometry of the hydraulic system 1 may define a maximum pressure for different positions of the hydraulic cylinder 2 and the pressure can be different in outwards or inwards movement. The flowrates into and out from the hydraulic cylinder 2 can be adjusted as well. A number of flowrates is only limited by a resolution of the hydraulic cylinder's position and a speed sensor.

Figure 2A:
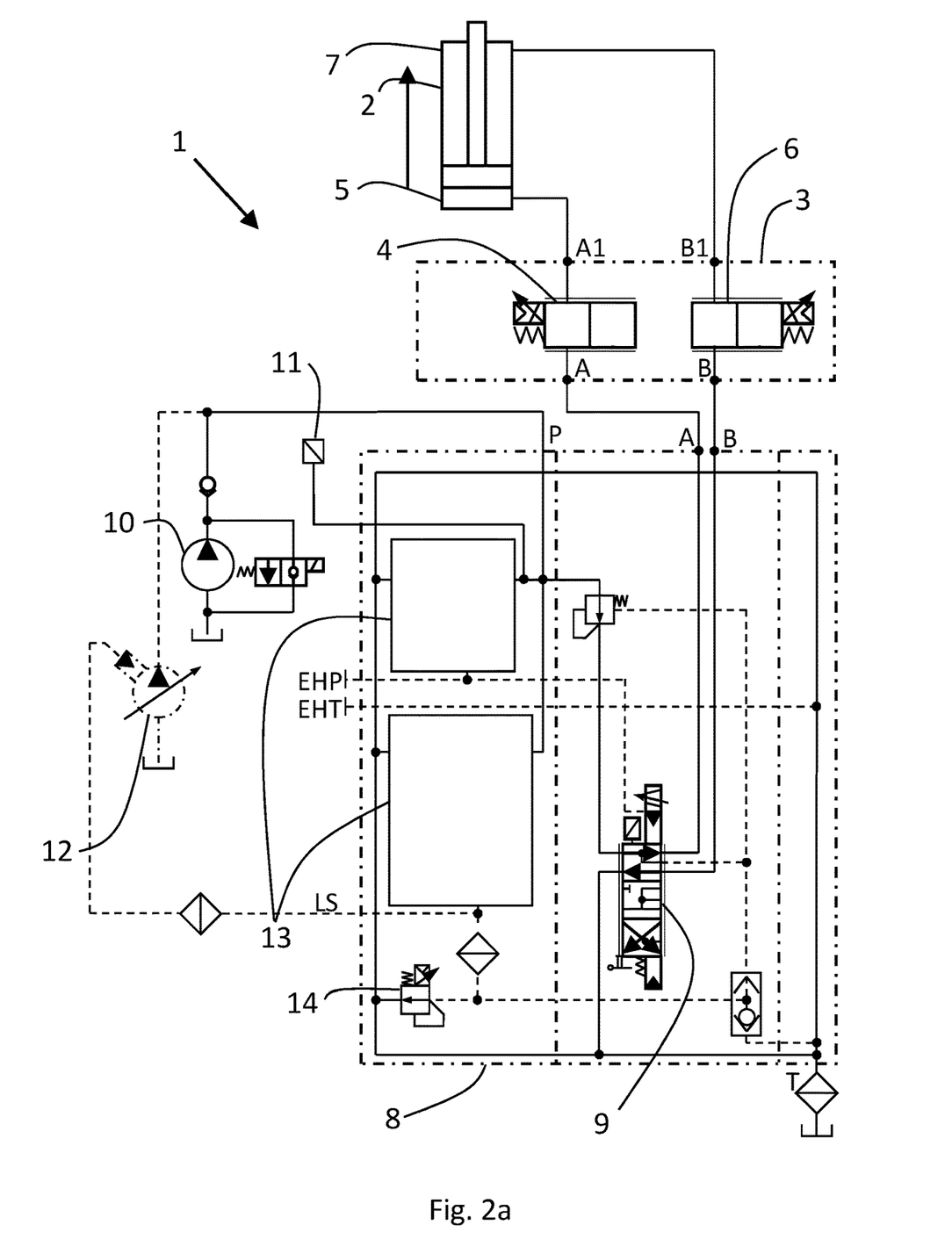
FIG. 2a is a schematic diagram showing the hydraulic system of FIG. 1 in a first mode.

FIG. 2a schematically shows the hydraulic system 1 according to a first example of a first mode of the hydraulic system 1 activated. The first mode may also be referred to as a pushing/pulling mode. In the first mode, or the pushing/pulling mode, an operator has input a desired extension or retraction speed for the hydraulic cylinder 2 by means of an operator controller (not shown). A working pressure in the hydraulic system 1 is measured by the pressure sensor 11. If the measured working pressure is lower than a first pressure needed to move the hydraulic cylinder 2 at a desired extension or retraction speed with the load attached to it, a load from the hydraulic cylinder 2 is identified to determine the first pressure and a position of the directional flow-control valve 9 is adjusted to provide flow to extend the hydraulic cylinder 2. As the directional flow-control valve 9 is a proportional valve, the directional flow-control valve 9 is used to control the speed of the hydraulic cylinder 2. A position of the first load-holding valve 4 is set to a closed position allowing fluid to pass through to the first end 5 of the hydraulic cylinder 2. The position of the second load-holding valve 6 is set to a fully open position allowing fluid to pass through to tank.

It is contemplated that the above-described method can be performed in a hydraulic system with or without load-sensing. A system with load-sensing is more energy efficient than a system without, but energy usage may also be reduced in a system without load-sensing.

Figure 2B:
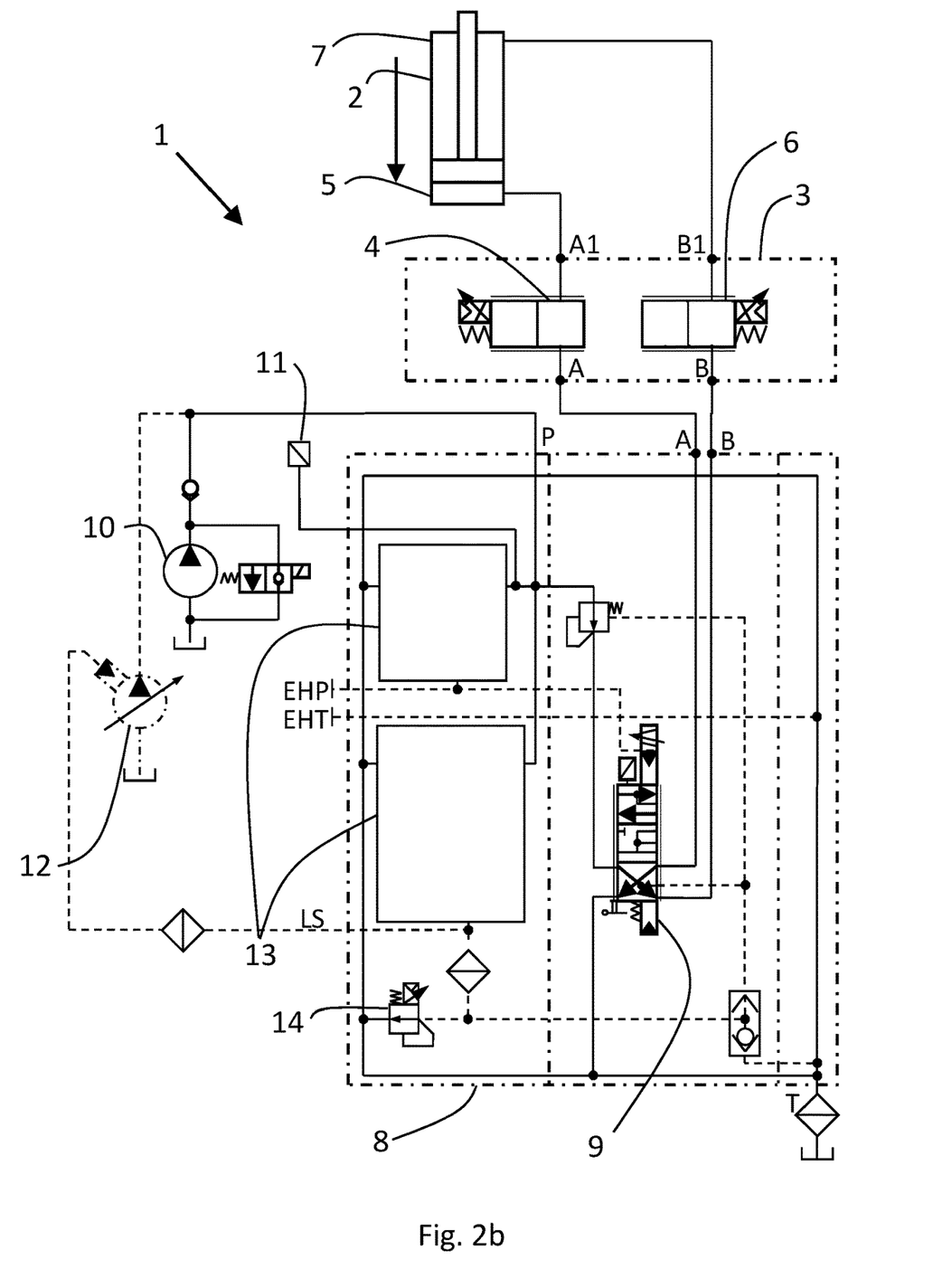
FIG. 2b is a schematic diagram showing the hydraulic system of FIG. 1 in a second mode.

FIG. 2b schematically shows the hydraulic system 1 according to a second mode of the hydraulic system 1 activated. The second mode can also be referred to as a neutral movement mode and may be used when the hydraulic cylinder 2 works in light conditions, e.g. with the load close to center after having passed center in a longitudinal motion in either direction. The second mode may be activated if the measured working pressure decreases and if the speed of the hydraulic cylinder 2 is constant or increasing relative the desired extension or retraction speed input by the operator controller. In the second mode, a position of the directional flow-control valve 9 is adjusted to provide fluid to the second end 7 of the hydraulic cylinder 2. The position of the directional flow-control valve 9 and the first load-holding valve 4 are adjusted simultaneously to control the speed of the hydraulic cylinder 2 with the first load-holding valve 4 adjusting the amount of fluid passing to tank and the directional flow-control valve 9 adjusting the amount of fluid passing to the second end 7 of the hydraulic cylinder 2. The position of the second load-holding valve 6 may be set to a closed position allowing fluid to pass through to the second end 7 of the hydraulic cylinder 2.

Figure 2C:
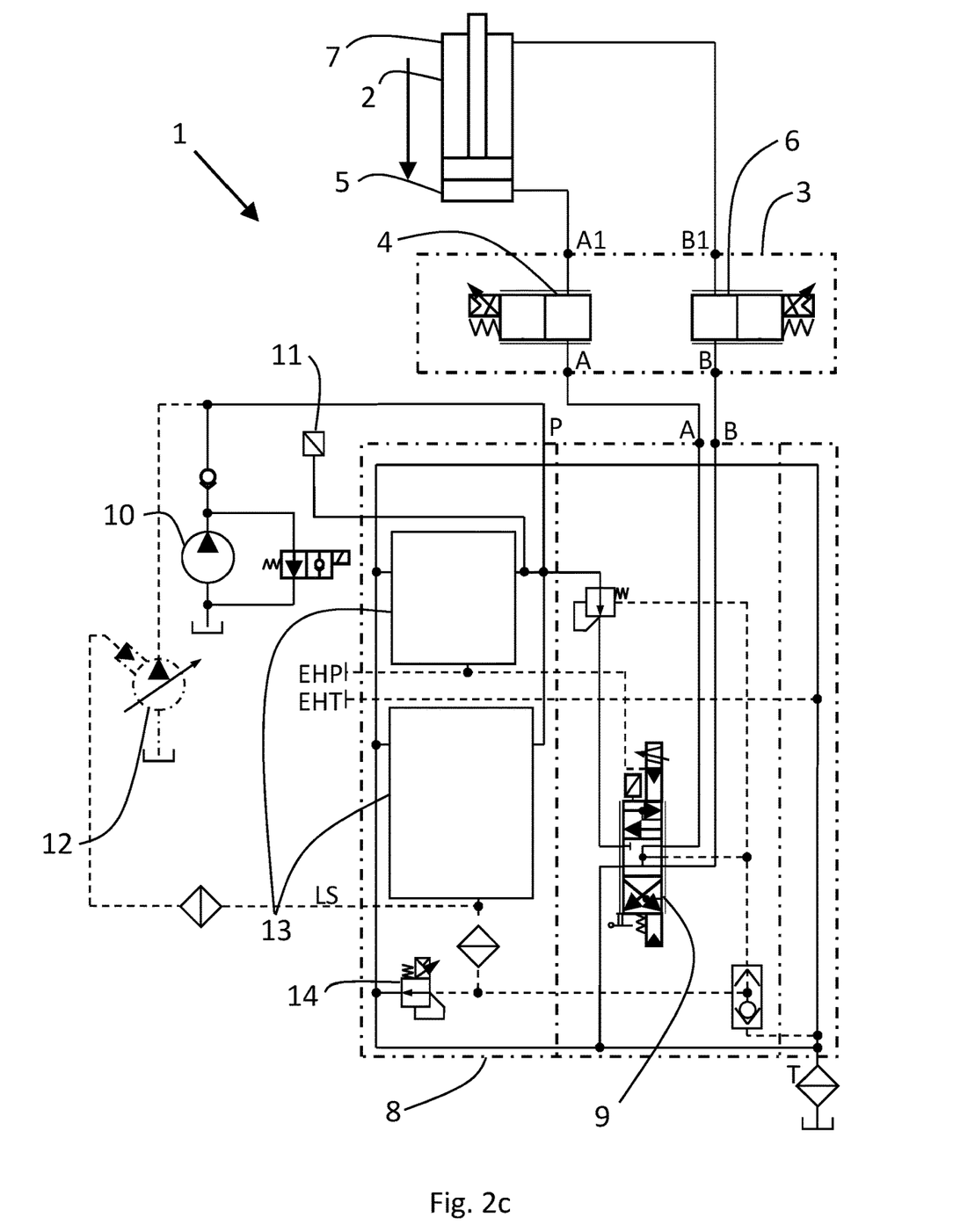
FIG. 2c is a schematic diagram showing the example of the hydraulic system of FIG. 1 in a third mode.

FIG. 2c schematically shows the hydraulic system 1 according to a third mode of the hydraulic system 1 activated. The third mode is a gravity-assisted movement mode and may be used when the load accelerates the hydraulic cylinder 2 by means of gravity. When the directional flow-control valve 9 is fully open and the measured working pressure is lower than a predetermined pressure for a desired speed of the hydraulic cylinder 2 input by the operator controller, this indicates that the hydraulic cylinder 2 moves by its own weight or is said to be gravity-assisted. A position of the directional flow-control valve 9 is set to center and the first load-holding valve 4 adjusts an amount of fluid passing to tank from the first end 5 of the hydraulic cylinder 2 to control the speed of the hydraulic cylinder 2. A position of the second load-holding valve 6 is set to a fully open position.

Figure 3:
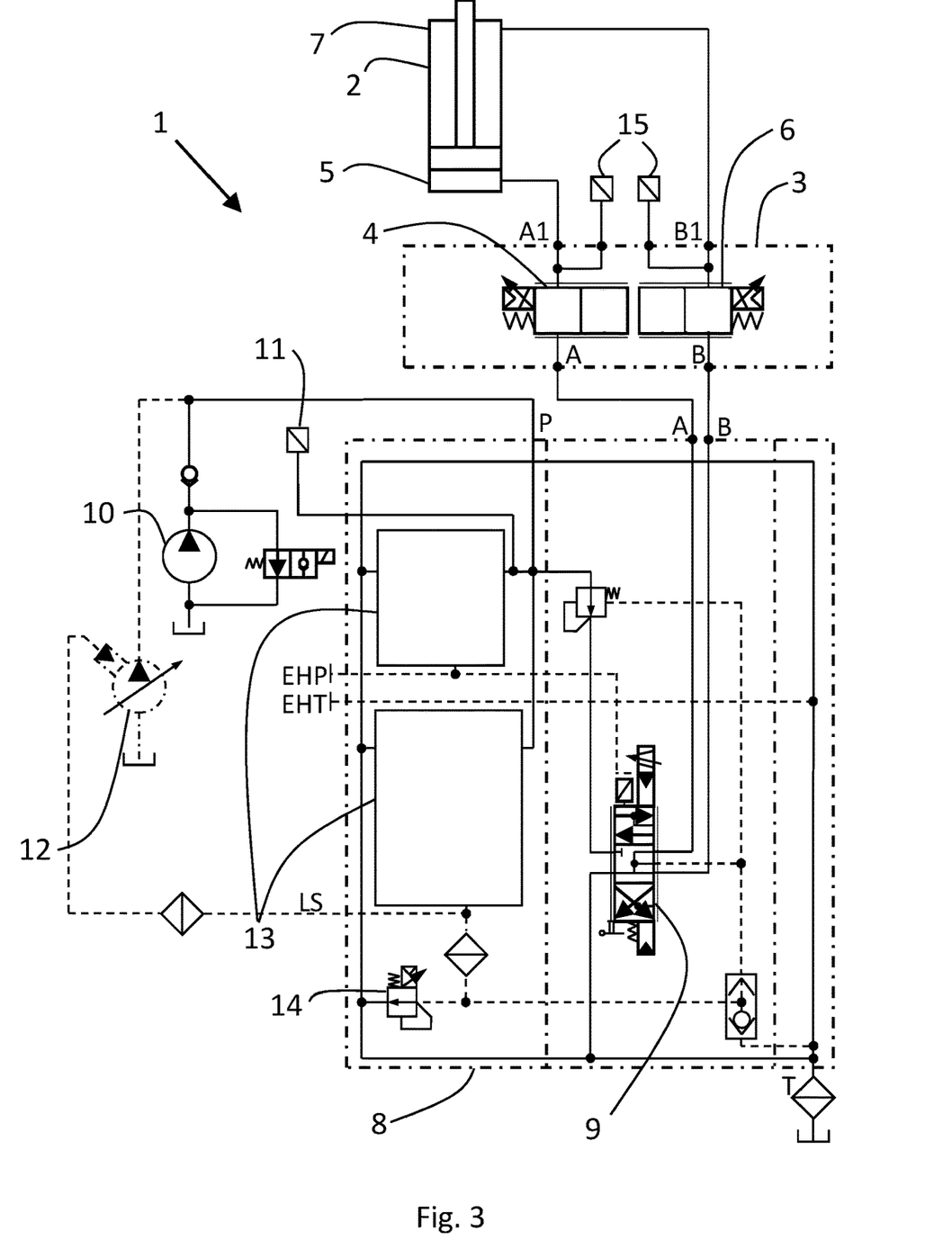
FIG. 3 is a schematic diagram showing another example of a hydraulic system in an inactive state.

FIG. 3 schematically shows the hydraulic system 1 according to another example with the hydraulic system 1 in an inactive state. In this example, a differential pressure over the load-holding valve arrangement 3 is measured using a differential pressure sensor 15 or two pressure sensors. A predefined differential pressure can be used instead of the measurements from the hydraulic cylinder 2 position and speed sensor of the first example.

When the differential pressure over the load-holding valve arrangement 3 is used to control the operation of the hydraulic system 1, a pre-determined differential pressure is set. In this example, the second and third modes may operate simultaneously. The counter pressure experienced by the hydraulic system 1 when the system operates without a load is reduced and when the system operates with a load, the load assists with the movement of the hydraulic cylinder 2.

Figure 4:
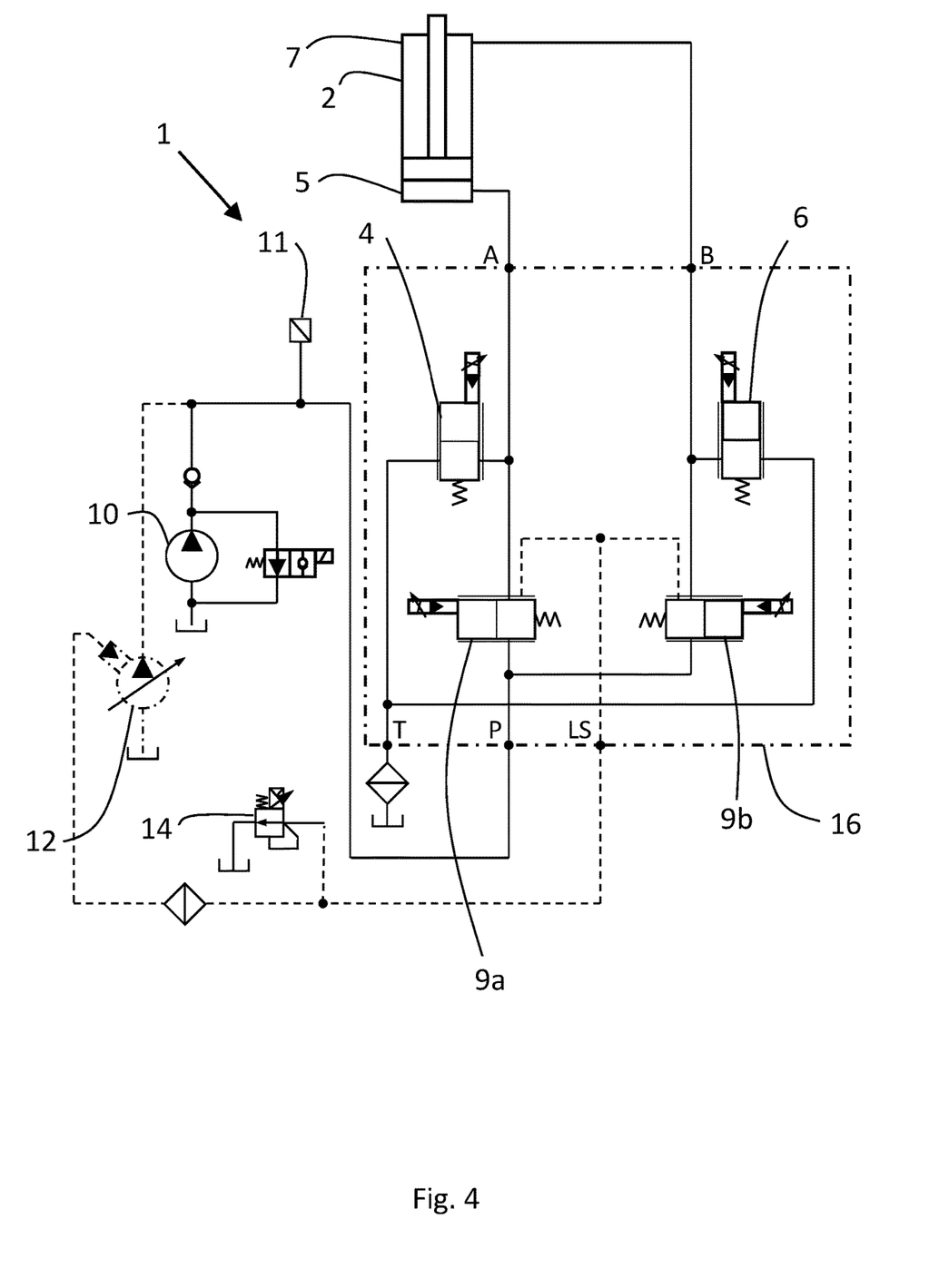
FIG. 4 is a schematic diagram showing another example of a hydraulic system in an inactive state.

FIG. 4 schematically shows the hydraulic system 1 according to a third example embodiment with the hydraulic system 1 in an inactive state. A configuration of the hydraulic system 1 of FIG. 4 differs from the configuration of the hydraulic system 1 shown in FIG. 1 in that the hydraulic system 1 of FIG. 4 includes a combined load-holding and directional flow-control valve arrangement 16. The combined load-holding and directional flow-control valve arrangement 16 includes a load-holding valve arrangement 3 including the first and second load-holding valves 4, 6 and a directional flow-control valve 9 including first and second directional flow-control valves 9a, 9b.

The first and second load-holding valves 4, 6 of the combined load-holding and directional flow-control valve arrangement 16 may be electronically operated, proportional valves. The first and second directional flow-control valves 9a, 9b of the combined load-holding and directional flow-control valve arrangement 16 may be electronically operated, proportional valves. The first and second load-holding valves 4, 6 and the first and second directional flow-control valves 9a, 9b can be operated in other ways such as direct-acting, pilot-operated, or servo-operated.

The following description illustrates examples of functions of the hydraulic system 1 during the three different modes described above. In these examples, it is assumed that the hydraulic cylinder 2 is operating with a load attached to the hydraulic cylinder 2 and that the hydraulic cylinder 2 has a range of motion where the load moves over center.

A geometry of the hydraulic system 1 may define a maximum pressure for each different position of the hydraulic cylinder 2 and the pressure can be different in outwards or inwards movement. The flowrates into and out from the hydraulic cylinder 2 can be adjusted as well. The number of flowrates is only limited by a resolution of the hydraulic cylinder 2 position and speed sensor.

Figure 5A:
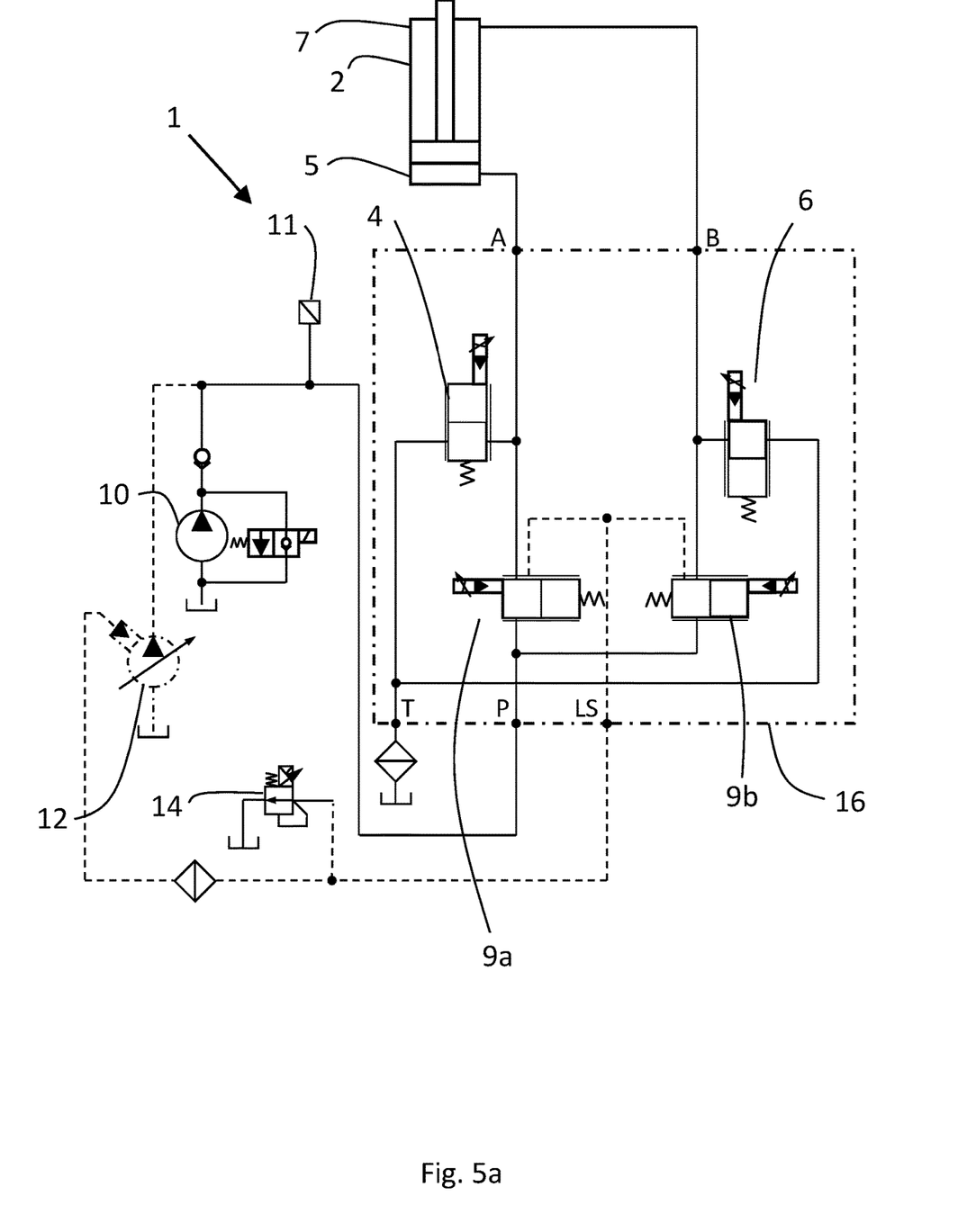
FIG. 5a is a schematic diagram showing an example of a hydraulic system in a first mode.

FIG. 5a schematically shows the hydraulic system 1 according to a third example embodiment with the first mode of the hydraulic system 1 activated. In the first mode, or the pushing/pulling mode, an operator has input a desired extension or retraction speed for the hydraulic cylinder 2 by means of the operator controller. A working pressure in the hydraulic system 1 is measured by the pressure sensor 11. If the measured working pressure is lower than a first pressure needed to move the hydraulic cylinder 2 at the desired extension or retraction speed with the load attached to it, a load from the hydraulic cylinder 2 is identified to determine the first pressure and a position of the first and second directional flow-control valves 9a, 9b is adjusted to provide flow to extend the hydraulic cylinder 2. As the first and second directional flow-control valves 9a, 9b are proportional valves, the first and second directional flow-control valves 9a, 9b may be used to control the speed of the hydraulic cylinder 2. The position of the first load-holding valve 4 is set to a closed position allowing fluid to pass through to the first end 5 of the hydraulic cylinder 2. The position of the second load-holding valve 6 is set to a fully open position allowing fluid to pass through to tank.

The method described above can be performed in a hydraulic system with or without load-sensing. A system with load-sensing is more energy efficient than a system without, but energy usage is reduced also in a system without load-sensing.

Figure 5B:
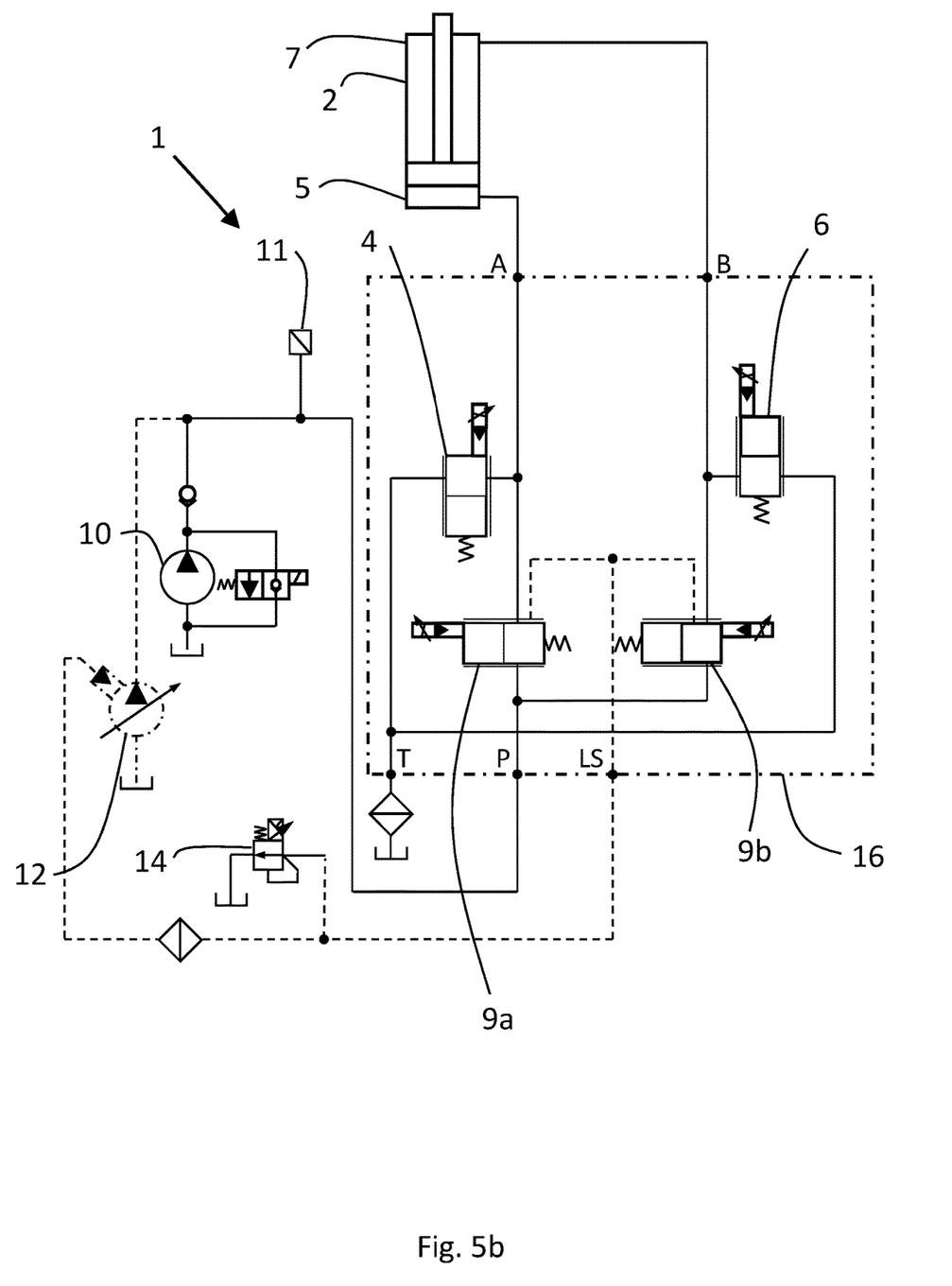
FIG. 5b is a schematic diagram showing the example of the hydraulic system of FIG. 5A in a second mode.

FIG. 5b schematically shows the hydraulic system 1 according to a third example embodiment with the second mode of the hydraulic system 1 activated. As described above, the second mode can be used when the hydraulic cylinder 2 works in light conditions, e.g. with the load close to center after having passed center in a longitudinal motion in either direction. The second mode may be activated if the measured working pressure decreases, and if a speed of the hydraulic cylinder 2 is constant or increasing relative to the desired extension or retraction speed input by the operator controller. In the second mode, a position of the first and second directional flow-control valves 9a, 9b may be adjusted to provide fluid to the second end 7 of the hydraulic cylinder 2. The position of the first and second directional flow-control valves 9a, 9b and the first load-holding valve 4 may be adjusted simultaneously to control the speed of the hydraulic cylinder 2 with the first load-holding valve 4 adjusting an amount of fluid passing to tank and the first and second directional flow-control valves 9a, 9b adjusting an amount of fluid passing to the second end 7 of the hydraulic cylinder 2. A position of the second load-holding valve 6 may be set to a closed position allowing fluid to pass through to the second end 7 of the hydraulic cylinder 2.

Figure 5C:
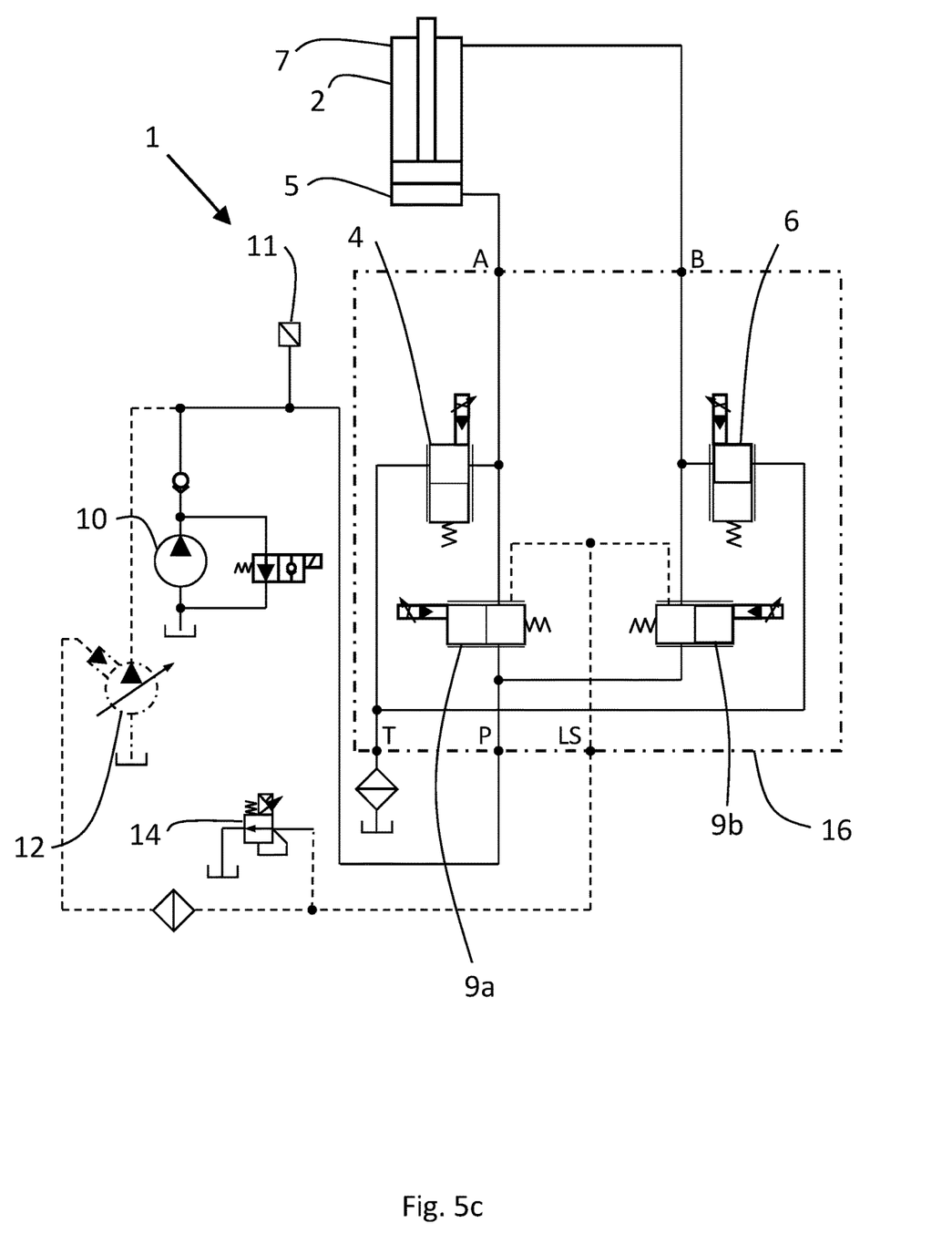
FIG. 5c is a schematic diagram showing the example of the hydraulic system of FIG. 5A in a third mode.

FIG. 5c schematically shows the hydraulic system 1 according to an embodiment with the third mode of the hydraulic system activated. As described above, the third mode may be a gravity-assisted movement mode and may be used when a load accelerates the hydraulic cylinder 2 by means of gravity. When the first and second directional flow-control valves 9a, 9b are fully open and the measured working pressure is lower than a predetermined pressure for the desired speed of the hydraulic cylinder 2, this indicates that the hydraulic cylinder 2 moves by its own weight or is said to be gravity-assisted. The position of the first and second directional flow-control valve 9a, 9b is set to open center, i.e. ports A and B are connected to tank, and the first load-holding valve 4 adjusts the amount of fluid passing to tank from the first end 5 of the hydraulic cylinder 2 to control the speed of the hydraulic cylinder 2. The position of the second load-holding valve 6 is set to a fully open position.

Figure 6:
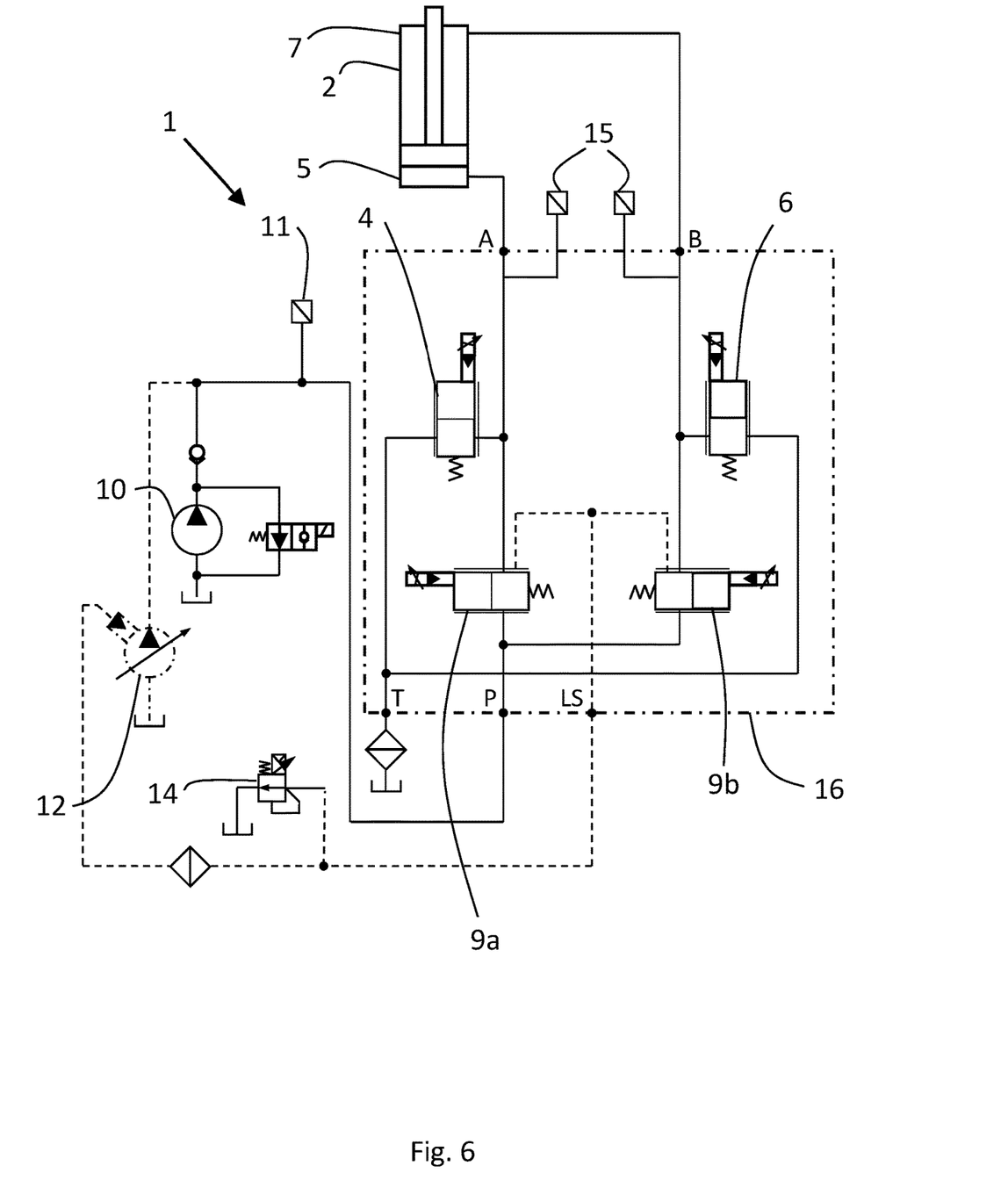
FIG. 6 is a schematic diagram showing yet another example of a hydraulic system in an inactive state.

FIG. 6 schematically shows the hydraulic system 1 according to another example embodiment with the hydraulic system 1 in an inactive state. In the second example, a differential pressure over the load-holding valve arrangement 3 is measured using a differential pressure sensor 15 or two pressure sensors. A predefined differential pressure can be used instead of the measurements from the hydraulic cylinder 2 position and speed sensor of the first example.

When the differential pressure over the load-holding valve arrangement 3 is used to control the operation of the hydraulic system 1, a predetermined differential pressure is set. In this example, the second and third modes operate simultaneously. The counter pressure experienced by the hydraulic system 1 when the system operates without a load is reduced and when the system operates with a load, the load assists with movement of the hydraulic cylinder 2.

Reference signs mentioned in the claims should not be seen as limiting the extent of the matter protected by the claims, and their sole function is to make the claims easier to understand.

As will be realized, embodiments of the disclosure are capable of modification in various obvious respects, all without departing from the scope of the appended claims. Accordingly, the drawings and the description thereto are to be regarded as illustrative in nature, and not restrictive.

What is claimed is:

1. A hydraulic system comprising:
  a hydraulic cylinder;
  a load-holding valve arrangement fluidly connected to the hydraulic cylinder, the load-holding valve arrangement including a first load-holding valve connected to a first end of the hydraulic cylinder and a second load-holding valve connected to a second end of the hydraulic cylinder;
  a flow-control valve arrangement comprising a directional flow-control valve and at least one hydraulic pump;
  a working pressure sensor;
  a differential pressure sensor arranged to measure a differential pressure over the load-holding valve arrangement,
  wherein one of a desired extension speed and a desired retraction speed of the hydraulic cylinder is controlled by adjusting positions of the directional flow-control valve, the first load-holding valve, and the second load-holding valve based on a measured working pressure in the hydraulic system sensed by the working pressure sensor and a measured speed of the hydraulic cylinder or based on the differential pressure over the load-holding valve arrangement; and
  a speed sensor, wherein the system is configured for activating a first mode if the measured working pressure within the hydraulic system is lower than a first pressure needed to move the hydraulic cylinder at one of the desired extension speed and the desired retraction speed as measured by the speed sensor, wherein a load from the hydraulic cylinder is identified by the hydraulic system to determine the first pressure needed to move the hydraulic cylinder at the one of the desired extension speed and the desired retraction speed, the working pressure is increased by the at least one hydraulic pump, the position of the directional flow-control valve is adjusted to control the speed of the hydraulic cylinder, the position of the first load-holding valve is set to a closed position, and the position of the second load-holding valve is set to a fully open position.

2. The hydraulic system of claim 1, wherein the hydraulic system is configured for activating a second mode responsive to detection of the measured working pressure decreasing and detection of the speed of the hydraulic cylinder being one of a constant speed and an increasing speed relative to the one of the desired extension speed and the desired retraction speed, and wherein the position of the directional flow-control valve and the first load-holding valve is adjusted to control the speed of the hydraulic cylinder and the position of the second load-holding valve is set to a closed position.

3. The hydraulic system of claim 1, wherein the hydraulic system is further configured for activating a third mode if the measurement for determining if one of a sensed position of the directional flow-control vale, the first load-holding valve, and the second load-holding valve, the measured speed, and the measured working pressure of the hydraulic cylinder indicates that the hydraulic cylinder is moving by a weight of the hydraulic cylinder, wherein the at least one hydraulic pump is shut off, the position of the directional flow-control valve is set to a center position, the first load-holding valve is adjusted to control the speed of the hydraulic cylinder, and the position of the second load-holding valve is set to the fully open position.

4. The hydraulic system of claim 1, wherein the load-holding valve arrangement is separate from or integrated with the flow-control valve arrangement.

5. The hydraulic system of claim 1, further comprising a proportional pressure limiter arranged to adjust the working pressure in the hydraulic system, when in the first mode.

6. The hydraulic system of claim 1 wherein the hydraulic system is further configured for activating multiple modes simultaneously, and wherein the positions of the directional flow-control valve and the first load-holding valve are adjusted to control the speed of the hydraulic cylinder.

7. The hydraulic system of claim 1, wherein the hydraulic system is configured for use with a vehicle.

8. A hydraulic system comprising:
  a hydraulic cylinder;
  a load-holding valve arrangement fluidly connected to the hydraulic cylinder, the load-holding valve arrangement including a first load-holding valve connected to a first end of the hydraulic cylinder and a second load-holding valve connected to a second end of the hydraulic cylinder;
  a flow-control valve arrangement comprising a directional flow-control valve and at least one hydraulic pump;
  a working pressure sensor;
  a differential pressure sensor arranged to measure a differential pressure over the load-holding valve arrangement; and
  a third sensor adapted to measure at least a position of the hydraulic cylinder, wherein the system is configured for activating a first mode if a measured working pressure within the hydraulic system sensed by the working pressure sensor is lower than a first pressure needed to move the hydraulic cylinder at one of a desired extension speed and a desired retraction speed, wherein the one of the desired extension speed and the desired retraction speed of the hydraulic cylinder is controlled by adjusting positions of the directional flow-control valve, the first load-holding valve and the second load-holding valve based on a measured working pressure in the hydraulic system sensed by the working pressure sensor and the measured differential pressure over the load-holding valve arrangement, and wherein a load from the hydraulic cylinder is identified by the hydraulic system to determine a first pressure needed to move the hydraulic cylinder at the one of the desired extension speed and the desired retraction speed, the working pressure is increased by the at least one hydraulic pump, the position of the directional flow-control valve is adjusted to control a speed of extension or a speed of retraction of the hydraulic cylinder, the position of the first load-holding valve is set to a closed position, and the position of the second load-holding valve is set to a fully open position.

* * * * *